United States Patent
Kotani et al.

(10) Patent No.: US 6,731,452 B1
(45) Date of Patent: May 4, 2004

(54) DATA RECORDING AND/OR REPRODUCING APPARATUS AND METHOD

(75) Inventors: Yasutaka Kotani, Tokyo (JP); Masayuki Mizuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 09/665,515

(22) Filed: Sep. 19, 2000

(30) Foreign Application Priority Data

Sep. 20, 1999  (JP) ............................................. P11-266051

(51) Int. Cl.⁷ ................................................ G11B 5/584
(52) U.S. Cl. ...................................................... 360/77.13
(58) Field of Search ................................ 360/77.13, 75, 360/77.01, 77.12, 83, 84, 93; 386/67, 68, 74, 81

(56) References Cited

U.S. PATENT DOCUMENTS

| | | | | |
|---|---|---|---|---|
| 4,525,750 A | * | 6/1985 | Hamalainen | 386/21 |
| 4,539,615 A | * | 9/1985 | Arai et al. | 360/121 |
| 4,930,024 A | * | 5/1990 | Kanda et al. | 386/77 |
| 5,339,165 A | * | 8/1994 | Inoue et al. | 386/72 |
| 5,412,517 A | * | 5/1995 | Fujimori | 360/64 |
| 5,517,370 A | * | 5/1996 | Tanaka | 369/44.23 |
| 5,585,973 A | * | 12/1996 | Kim | 369/44.24 |
| 5,740,306 A | * | 4/1998 | Shinohara et al. | 250/201.5 |
| 5,745,317 A | * | 4/1998 | Sano et al. | 360/73.11 |
| 5,926,610 A | * | 7/1999 | Sugiyama et al. | 386/111 |
| 5,966,260 A | * | 10/1999 | Ikeda et al. | 360/53 |
| 5,991,109 A | * | 11/1999 | Taniguchi et al. | 360/64 |
| 6,011,665 A | * | 1/2000 | Ohishi et al. | 360/64 |
| 6,115,535 A | * | 9/2000 | Iwamoto et al. | 360/77.03 |
| 6,128,166 A | * | 10/2000 | Tanaka et al. | 360/78.04 |
| 6,144,518 A | * | 11/2000 | Magnusson | 360/77.13 |
| 6,304,410 B1 | * | 10/2001 | Kita et al. | 369/13.29 |
| 6,349,012 B1 | * | 2/2002 | Okamoto et al. | 386/124 |
| 6,490,108 B1 | * | 12/2002 | Fukuda | 360/48 |

* cited by examiner

*Primary Examiner*—David Hudspeth
*Assistant Examiner*—Jason Olson
(74) *Attorney, Agent, or Firm*—Frommer Lawrence & Haug LLP; William S. Frommer; Bruno Polio

(57) ABSTRACT

To assure good data playback characteristics even when reading data from a magnetic tape having recording tracks at a narrow pitch, a data recording and/or reproducing apparatus is provided which includes a tape feeder 7 to feed a magnetic tape 100 in which data is recorded on recording tracks formed obliquely to the moving direction of the magnetic tape 100, a magnetic head 4 including a playback head having a width smaller than the recording width of the recording tracks to read data from the magnetic tape 100 and a record head to write data to the magnetic tape 100, a rotating drum 5 on which the magnetic tape 100 is scanned by the magnetic head 4, a rotating drum controller 6 to allow the playback head to scan the recording tracks at least two times in order to detect data recorded in the magnetic tape 100, and a read signal processor 3 to reproduce data recorded in the magnetic tape 100 from the data detected by the playback head having been allowed by the rotating drum controller 6 to scan the recording tracks the plurality of times.

10 Claims, 15 Drawing Sheets

DATA RECORDING AND/OR REPRODUCING APPARATUS AND METHOD

BACKGROUND OF THE INVENTION

1. Field of the Invention

The present invention relates to a data recording and/or reproducing apparatus and method in which the helical scanning is adopted to write data to a tape-shaped recording medium by a record head mounted on a rotating drum and read data from the recording medium by a playback head also mounted on the rotating drum.

2. Description of the Related Art

Many of the video tape recorders (VTR) adopt the helical scanning to write/read video data to/from a tape-shaped recording medium (will be referred to as "magnetic tape" hereinafter) by a plurality of magnetic heads mounted on a rotating drum.

The VTR adopts the azimuth recording to reduce, when reading data from recording tracks formed in a magnetic tape, a crosstalk noise caused by the detection of data from adjacent recording tracks.

FIG. 1 explains how the conventional magnetic heads having different azimuth angles record data to adjacent recording tracks, respectively. As shown, data are recorded to adjacent recording tracks 401 and 402 in recording patterns having different azimuth angles in a VTR using a first magnetic head in which a magnetic gap is formed to tilt a positive azimuth angle (+θ) in relation to the width of a magnetic tape and a second magnetic head in which a magnetic gap is formed to tilt a negative azimuth angle (−θ) in relation to that width, both mounted on a rotating drum. Thus in the conventional VTR, the azimuth loss is used to reduce the crosstalk between adjacent recording tracks.

In the conventional VTR, however, when the first and second magnetic heads are mounted on the rotating drum, the mechanical accuracy of the pairing of the magnetic heads and also that of azimuth recording are limited.

To avoid the above problems, it has been proposed and adopted to write or read data to or from recording tracks at a single azimuth angle by a single magnetic head mounted on a rotating drum.

In the VTR in which the helical scanning is adopted, the accuracy of the linearity of the recording pattern formed on the recording tracks is limited by the rotating accuracy of the rotating drum, etc. So, in the helical scanning type VTR, data should desirably be read from a magnetic tape by a non-tracking system, not by tracking of the recording tracks by the playback head.

However, with the use of a magnetic head with a single azimuth angle and data read/write by the non-tracking system as in the above, the crosstalk between the adjacent recording tracks cannot be reduced by using the azimuth loss and the signal-to-noise (S/N) ratio of the read signal is lower, which will result in no good data playback characteristics.

OBJECT AND SUMMARY OF THE INVENTION

It is therefore an object of the present invention to overcome the above-mentioned drawbacks of the prior art by providing a data recording and/or reproducing apparatus and method, which can assure good data playback characteristics even with a tape-shaped recording medium having a narrow track pitch.

The above object can be attained by providing a data recording and/or reproducing apparatus including according to the present invention:

means for feeding a tape-shaped recording medium in which data is recorded along recording tracks tilted in relation to the moving direction of the recording medium;

a writing/playback head having a playback head having a width smaller than the recording width of the recording tracks and which reads data from the tape-shaped recording medium, and a record head to write data along the recording tracks;

a rotating drum having the writing/playback head mounted thereon and on which the tape-shaped recording medium is scanned by the writing/playback head;

a reading controlling means for providing such a control that data recorded on the tape-shaped recording medium is detected with at least two scans of the recording medium by the playback head; and means for generating data recorded on the tape-shaped recording medium from the data detected by the playback head having been controlled by the reading controlling means to make the plurality of scans of the recording tracks.

In the above data recording and/or reproducing apparatus, the playback head narrower than the recording width of the recording tracks is controlled by the reading controlling means to make a controlled number of scans on the recording pattern. Thus, the playback head is made to scan the recording pattern a plurality of times by the non-tracking system, thereby reading data from the recording tracks. Therefore, data can be read with good characteristics even with a tape-shaped recording medium on which recording tracks are formed perpendicularly to the moving direction of the recording medium.

Also the above object can be attained by providing a data recording and/or reproducing method to be adopted in a data recording and/or reproducing apparatus including:

means for feeding a tape-shaped recording medium;

a writing/playback head having a playback head having a width smaller than the recording width of the recording tracks and which reads data from the tape-shaped recording medium, and a record head to write data along the recording tracks; and a rotating drum having the writing/playback head mounted thereon to move the writing/playback head on the tape-shaped recording medium, the method including, according to the present invention, steps of:

controlling the playback head to scan the recording tracks at least two times;

detecting data by the playback head having scanned the recording tracks the plurality of times; and generating, from the detected data, data recorded in the tape-shaped recording medium.

Thus, data can be read with good characteristics even with a tape-shaped recording medium on which recording tracks are formed perpendicularly to the moving direction of the recording medium.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

First, a tape-shaped recording medium (will be referred to as "magnetic tape" hereinafter) to and/or from which data is written and/or read by the data recording and/or reproducing apparatus according to the present invention.

Figure 1:
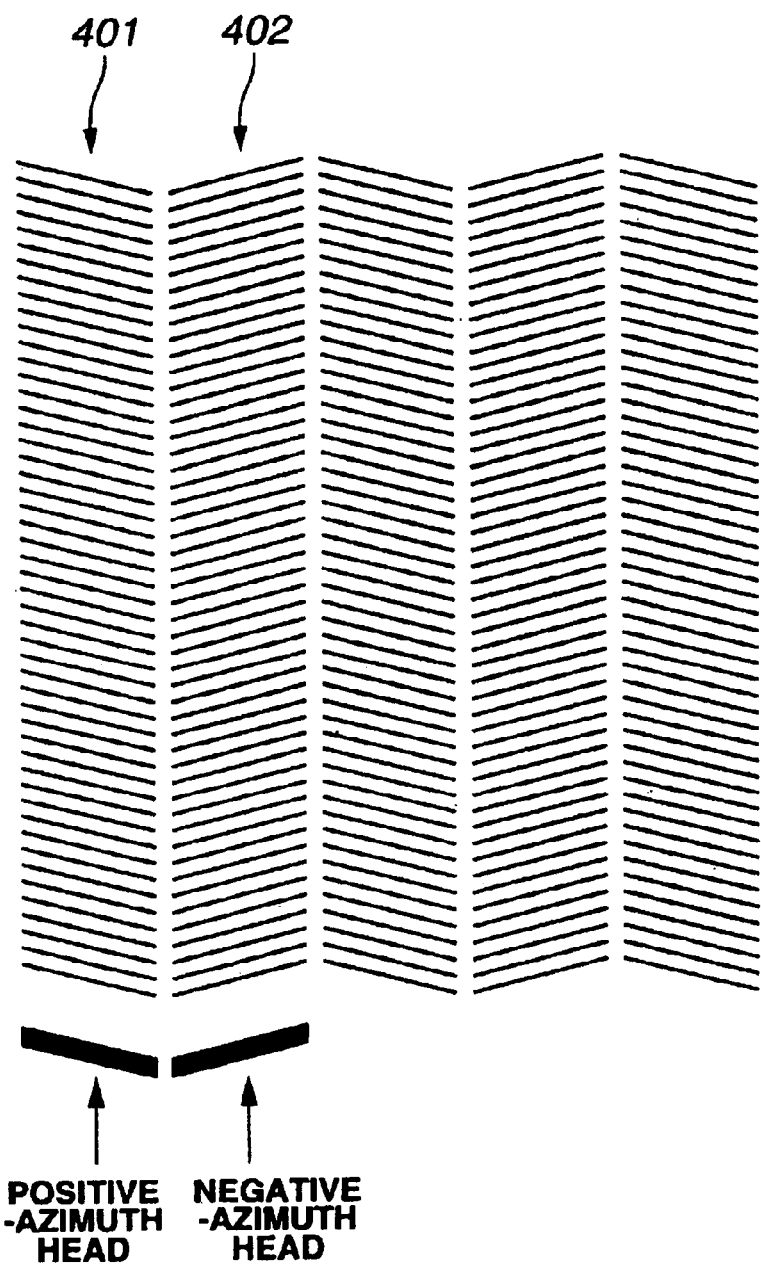
FIG. 1 explains how the conventional magnetic heads having different azimuth angles write data to adjacent recording tracks, respectively.
Figure 2:
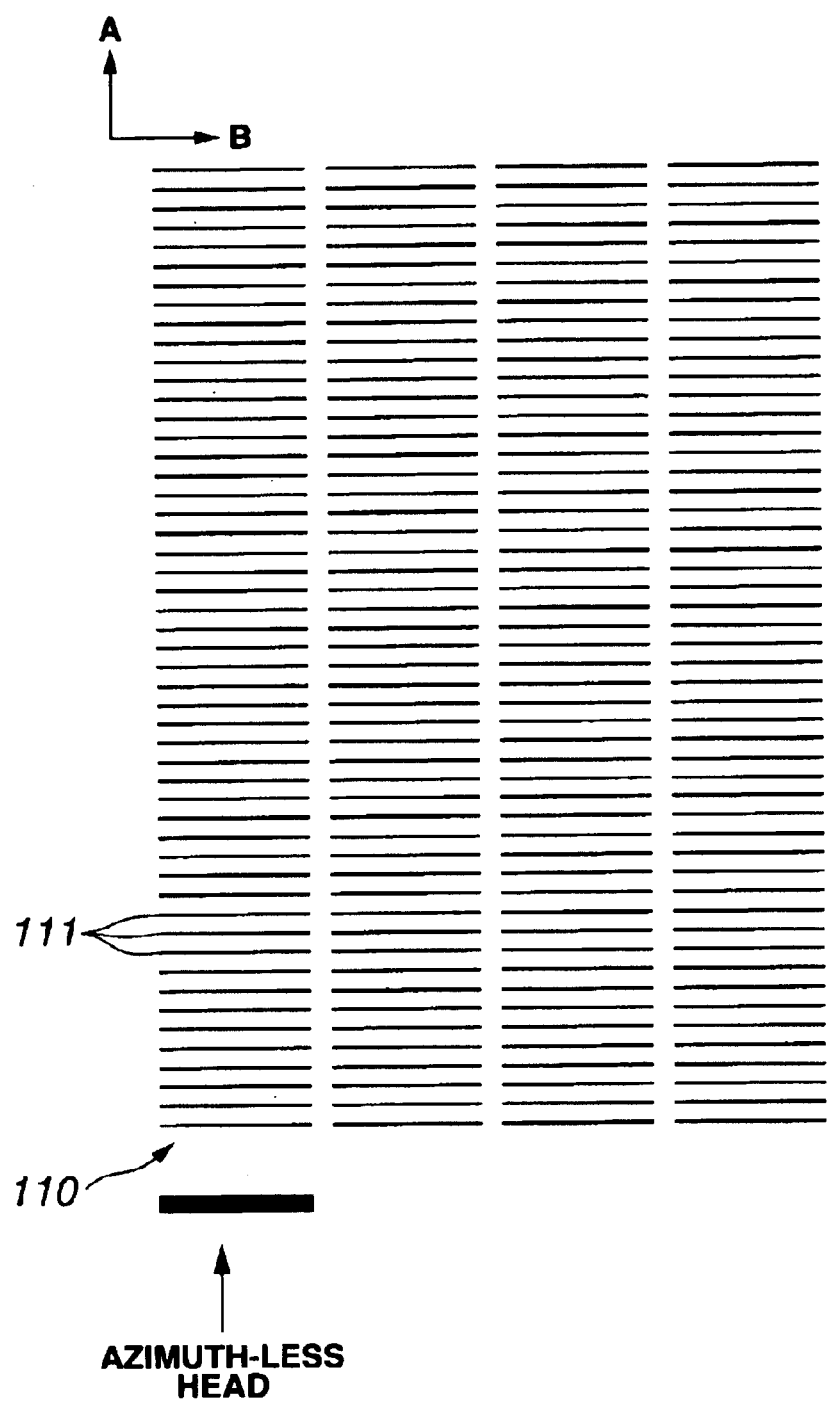
FIG. 2 explains a recording pattern of the recording and/or reproducing apparatus according to the present invention.

Referring now to FIG. 2, there is illustrated a recording pattern of the recording and/or reproducing apparatus according to the present invention. Recording patterns 111 are written to the magnetic tape by a so-called azimuth-less record head to form recording tracks 110. As shown in FIG. 2, a plurality of recording patterns 111 is written to the magnetic tape so that the longitudinal direction A of the recording tracks 110 is perpendicular to the longitudinal direction B of the recording patterns 111.

Figure 3:
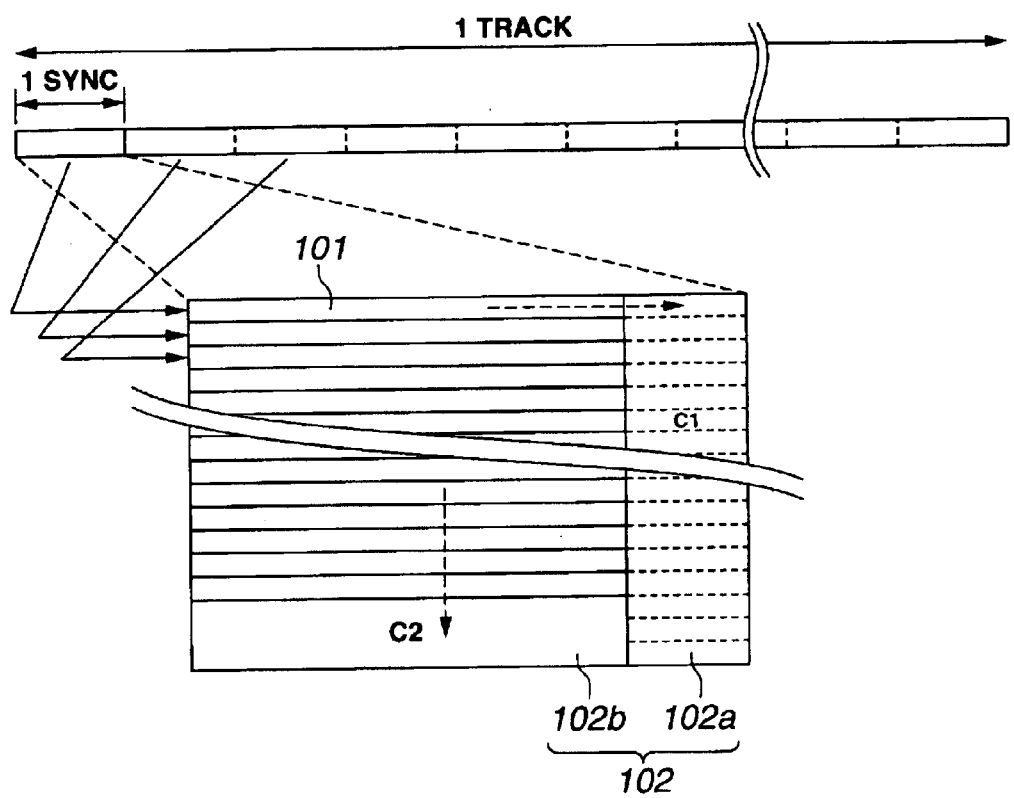
FIG. 3 explains a data format on a tape-shaped recording medium to/from which data is written/read by the recording and/or reproducing apparatus according to the present invention.

FIG. 3 shows a data format on a magnetic tape to/from which data is written/read by the recording and/or reproducing apparatus according to the present invention. As shown, video and audio data 101 of an image and sound and an error correction code 102, for example, will be written to such a data recording magnetic tape. For write to the magnetic tape, video and audio data are compressed and converted to a predetermined amount of data for each sync signal. As shown also in FIG. 3, the error correction code 102 is composed of C1ECC (error correction code) 102$a$ appended in the direction of C1 and C2ECC 102$b$ appended in the direction of C2 for the video and audio data.

Figure 4:
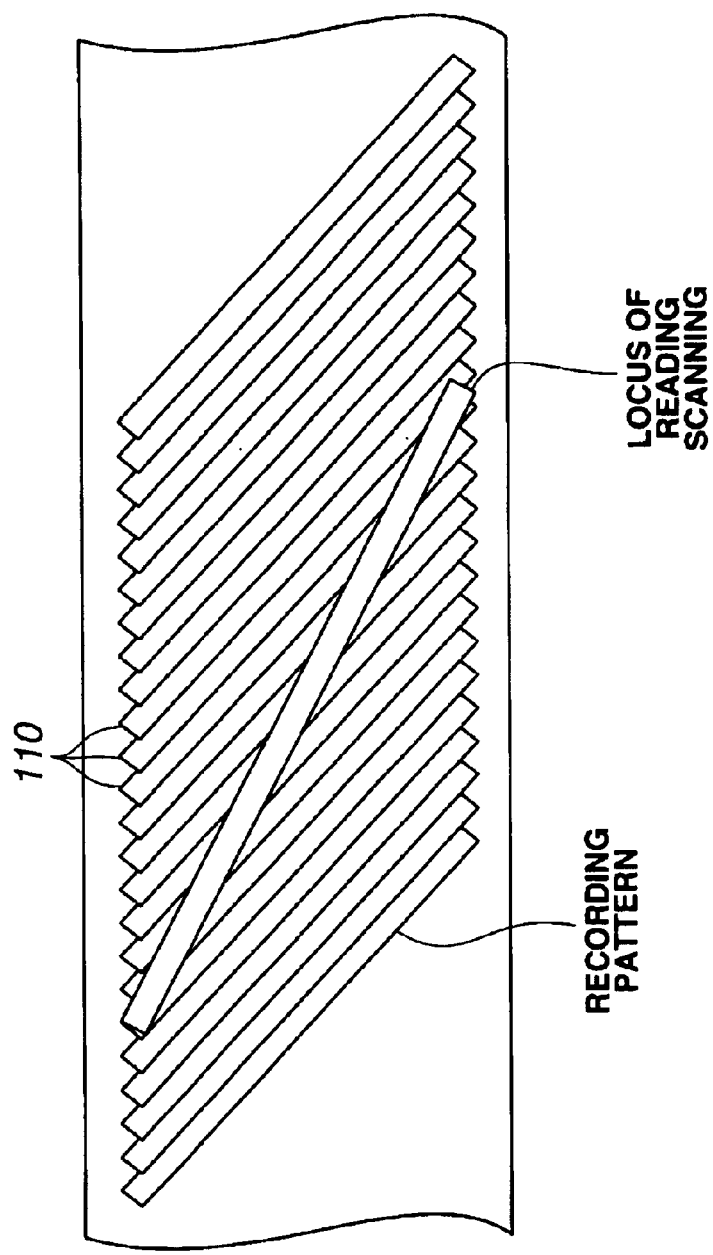
FIG. 4 explains a non-tracking reproduction effected by the recording and/or reproducing apparatus according to the present invention.

FIG. 4 explains a non-tracking reproduction effected by the recording and/or reproducing apparatus according to the present invention. When the recording tracks 110 are formed on the data recording magnetic tape as shown in FIG. 4, the playback head of the data recording and/or reproducing apparatus is made to scan the magnetic tape a larger number of times than the number of scans by the record head while the playback head is made to scan over the recording tracks, whereby a non-tracking reading is done to read data from the recording tracks 110.

Figure 5:
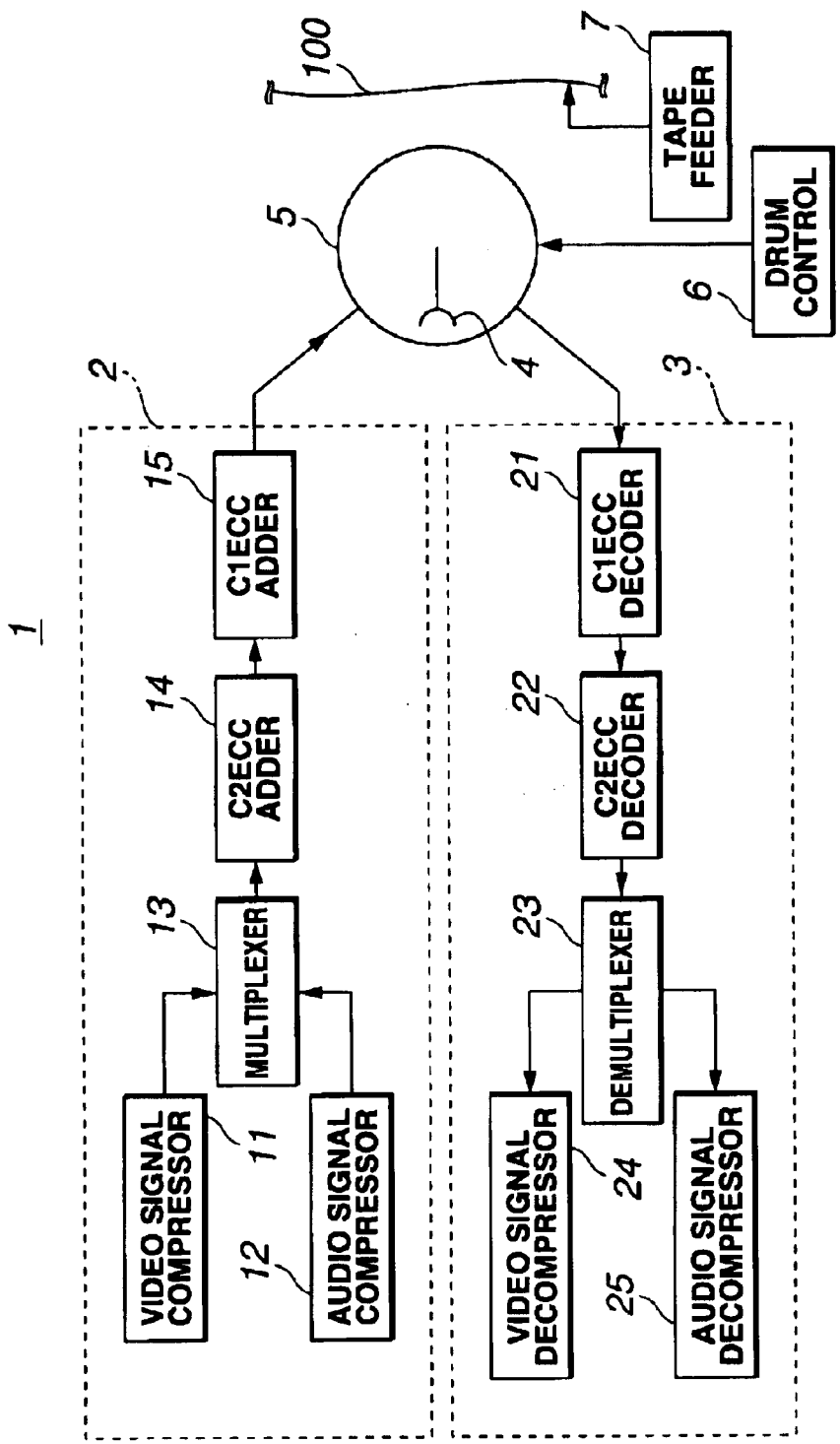
FIG. 5 is a block diagram of a first embodiment of the recording and/or reproducing apparatus according to the present invention.

Referring now to FIG. 5, there is illustrated in the form of a block diagram a first embodiment of the recording and/or reproducing apparatus according to the present invention, which records and/or reproduces data to and/or from a tape-shaped recording medium. The recording and/or reproducing apparatus is generally indicated with a reference 1, and it includes a recording signal processor 2 to generate a recording signal, read signal processor 3 to generate a read signal, drum controller 6 to rotate a rotating drum 5 having a magnetic head 4 mounted thereon, and a tape feeder 7 to feed a tape-shaped recording medium 100 (will be referred to as "magnetic tape" hereinafter) to which data are to be written.

The recording signal processor 2 includes a video signal compressor 11, audio signal compressor 12, multiplexer 13, C2ECC adder 14 and a C1ECC adder 15, and generates a recording signal composed of a video and audio signal and an error correction signal.

The video signal compressor 11 is supplied with an external video signal indicative of a picture, image, etc. to be written to the magnetic tape 100. The video signal compressor 11 compresses the external video signal in a predetermined format and provides the compressed video signal to the multiplexer 13.

The audio signal compressor 12 is supplied with an external audio signal indicative of a voice, music, etc. to be written to the magnetic tape 100. The audio signal compressor 12 compresses the external audio signal in a predetermined format and provides the compressed audio signal to the multiplexer 13.

The multiplexer 13 generates a video and audio data by multiplexing the video signal from the video signal compressor 11 and audio signal from the audio signal compressor 12, and provides the generated video and audio signal to the C2ECC adder 14.

The C2ECC adder 14 adds C2ECC to the video and audio data from the multiplexer 13, and provides the C1ECC adder 15 with a writing data composed of the video and audio data and C2ECC. The C2ECC added by the C2ECC adder 14 is an error correction code for use to correct an error in the direction of C2 during reading of the written data.

The C1ECC adder 15 adds C1ECC to the writing data from the C2ECC adder 14. The C1ECC added by the C1ECC adder 15 is an error correction code for use to correct an error in the direction of C1 during reading of the written data. The C1ECC adder 15 provides to the record head of the magnetic head 4 mounted on the rotating drum 5 the writing data composed of the video and audio data, C1ECC and C2ECC.

When writing the to-be-written data to the magnetic tape 100 in the recording and/or reproducing apparatus provided with the recording signal processor 2, the rotating drum controller 6 controls the rotating drum 5 for rotation at a predetermined speed while the tape feeder 7 feeds the magnetic tape 100 at a predetermined speed, thereby forming recording tracks in the recording pattern as shown in FIG. 2 and writing data to along the recording tracks. As having previously been described, in the recording and/or reproducing apparatus 1, the magnetic head 4 having a single azimuth is used as a record head to write data with the same azimuth.

As shown in FIG. 5, the read signal processor 3 includes a C1ECC decoder 21, C2ECC decoder 22, demultiplexer 23, video signal decompressor 24, and an audio signal decompressor 25, to provide a read signal detected by the magnetic head 4 to outside.

The C1ECC decoder 21 is supplied with a read signal from the playback head of the magnetic head 4 mounted on the rotating drum 5 for each sync signal. The C1ECC decoder 21 is supplied with a read signal composed of the video and audio data, C1ECC and C2ECC. Using the C1ECC, the C1ECC decoder 21 corrects an error of the video and audio data in the direction of C1, and provides the read signal corrected in the direction of C1 to the C2ECC decoder 22.

Using the C2ECC included in the read signal from the C1ECC decoder 21, the C2ECC decoder 22 corrects an error in the video and audio signal in the direction of C2, and provides the read signal corrected in the direction of C2 to the demultiplexer 23.

The demultiplexer 23 divides the read signal from the C2ECC decoder 22 into a video signal and audio signal, and provides the video signal to the video signal decompressor 24 while providing the audio signal to the audio signal decompressor 25.

The video signal decompressor 24 decompresses the video signal from the demultiplexer 23 in a predetermined format, and provided the decompressed video signal as a read signal to outside.

The audio signal decompressor 25 decompresses the audio signal from the demultiplexer 23 in a predetermined format, and provides the decompressed audio signal as a read signal to outside.

In the recording and/or reproducing apparatus thus constructed, the magnetic head 4 for reading data from the magnetic tape 100 consists of the record head and playback head. When writing data to the magnetic tape 100 in the recording and/or reproducing apparatus 1, the record head of the magnetic head 4 is used to generate a magnetic field corresponding to the data from the C1ECC adder 15 in order to write the data to the magnetic tape 100. When reading data from the magnetic tape 100 by the recording and/or reproducing apparatus 1; the playback bead of the magnetic head 4 is used to read data from the magnetic tape 100 and provide it to the C1ECC decoder 21.

The rotating drum 5 is driven to rotate according to a rotation drive control signal supplied from the rotating drum controller 6. The rotating drum 5 has the magnetic head 4 mounted thereon. While the rotating drum 5 is being rotated, the magnetic head 4 is put into contact with the magnetic tape 100.

The rotating drum controller 6 is supplied with a rotation drive control signal to control the rotating speed of the rotating drum 5. The rotating drum controller 6 controls the rotating drum 5 for rotation at one speed for data writing and at the other speed for data reading.

For writing or reading data, the tape feeder 7 generates a tape feed control signal for feeding the magnetic tape 100 at a predetermined speed.

In the data recording and/or reproducing apparatus 1, the rotating speed of the rotating drum 5 is controlled by the rotating drum controller 6 while the moving speed of the magnetic tape 100 is controlled by the tape feeder 7, for effecting a non-tracking reading in which data is read over the recording tracks.

Figure 6:
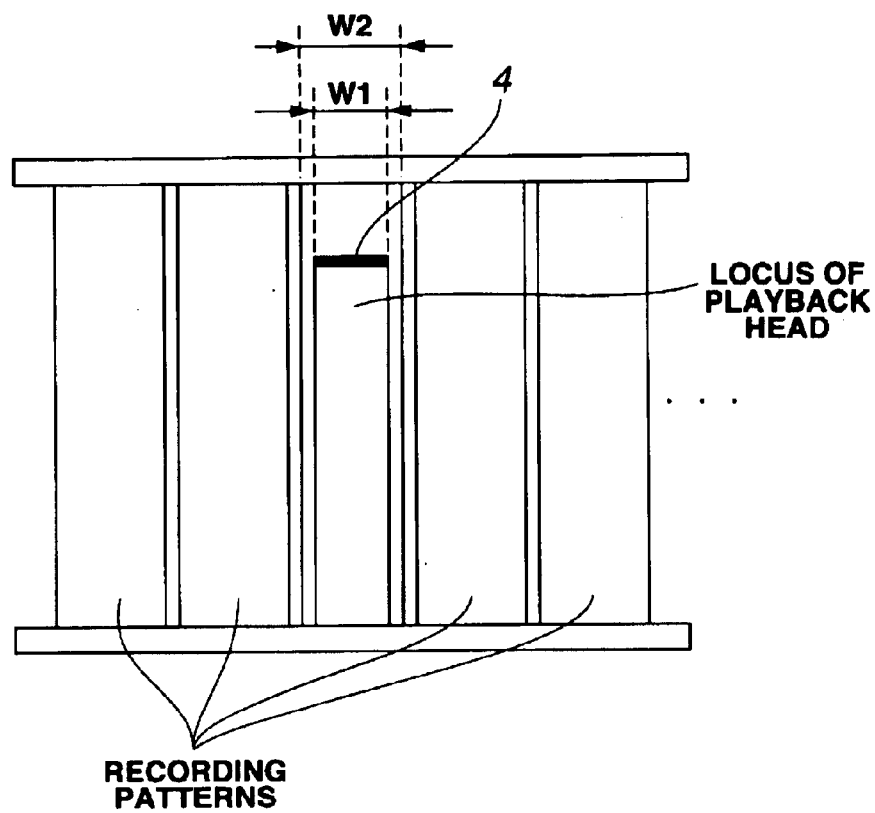
FIG. 6 explains the relation between the head width of the playback head and recording width of the recording pattern.

FIG. 6 is a schematic illustration of the relation between the head width W1 of the playback head of the magnetic head 4 and recording width W2 of the recording pattern. As shown, the head width W1 is smaller than the recording width W2, so the recording and/or reproducing apparatus 1 can read data with a minimization of the deterioration of S/N ratio due to increased leakage of magnetic fields from the adjacent recording tracks, taking place when one playback head scans over a plurality of recording tracks as shown in FIG. 2, whereby the recording and/or reproducing apparatus 1 can effect an ordinary azimuth recording with an azimuth-suppressed crosstalk between adjacent recording tracks and a minimized deterioration of the S/N ratio.

Therefore, even when the playback head scans the recording tracks for data reading, it can read data with no influence of data recorded in the adjacent recording patterns on the locus of the playback head movement as shown in FIG. 6.

In the recording and/or reproducing apparatus 1, when effecting non-tracking reading of data from the magnetic tape 100 in which recording tracks are formed by writing data by the azimuth-less record head, the playback head is moved to scan across the recording tracks.

Assume here that in the recording and/or reproducing apparatus 1, the ratio between the rotating speed of the rotating drum 5 for reading data from the magnetic tape 100 and that of the rotating drum 5 for writing data to the magnetic tape 100 is N (a positive integer). If the magnetic tape 100 is moved at the same speed for both data writing and reading, the playback head will scan recording patterns N times. Also assume that the feed pitch for one scan by the playback head is 1/N, and that the head width W1 of the playback head is as follows:

$$W1 = ((N-1)/N)*Tp \quad (1)$$

where Tp is a track pitch being a distance between adjacent recording patterns.

The playback head having the width W1 given by the equation (1) will scan recording patterns N times, but scan only a target one of the recording patterns at one of the N times without scanning the other, and thus it will not read data from the adjacent recording patterns.

Figure 7:
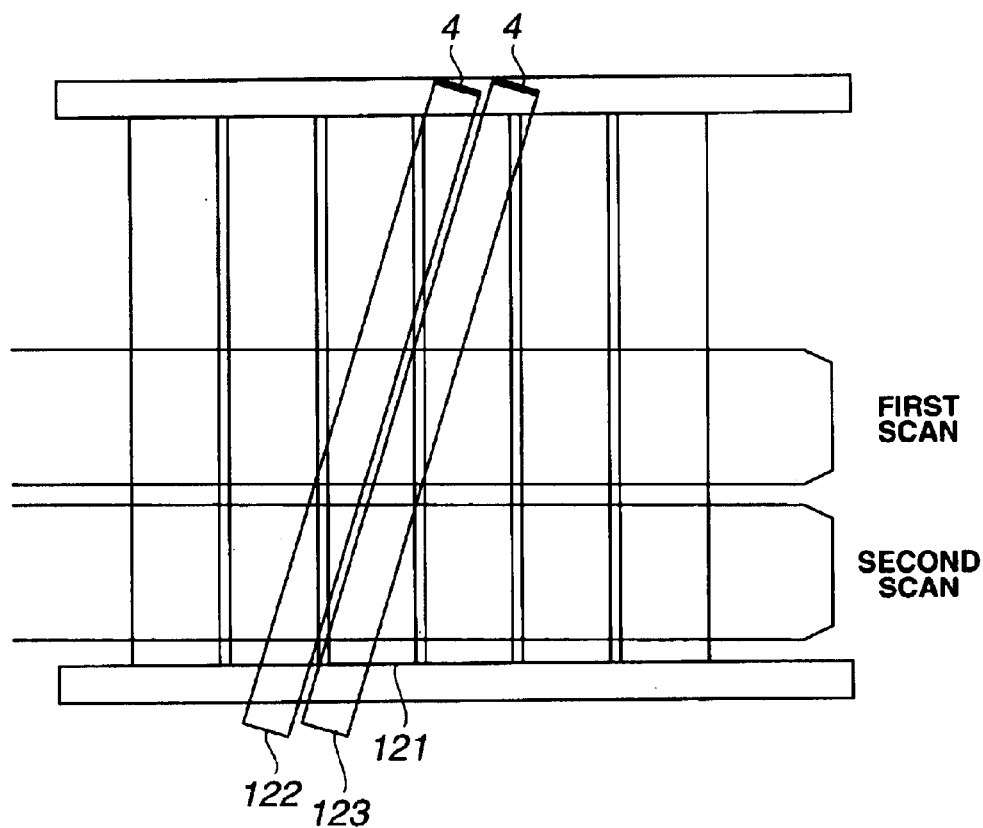
FIG. 7 explains how data is read from a target recording pattern by scanning the recording pattern twice in the recording and/or reproducing apparatus according to the present invention.

In the recording and/or reproducing apparatus 1, the number N of scans for reading data from the magnetic tape 100 is "2" for example. When the rotating drum controller 6 controls the rotating speed of the rotating drum 5 for data reading to double of that of the rotating drum 5 for data writing, the number of scans for data reading is double that for data writing and the head width W1 of the playback ahead is ½(Tp). Thus, as shown in FIG. 7, the recording and/or reproducing apparatus 1 will read data from a target recording pattern 121 by connecting data read from an area of the target recording pattern 121 where data is read by the first scan, and data read from an area of the target recording pattern 121 where data is read by the second scan.

In the recording and/or reproducing apparatus 1, the magnetic tape 100 is fed at the same speed for both data writing and reading and the rotating drum 5 is driven to rotate at a speed for data writing and at a speed double for data reading. Thus, the longitudinal feed pitch of the magnetic tape 100 for data reading is a half of that for data writing. Note that the relative physical relation between the first and second scans is constant.

Figure 8:
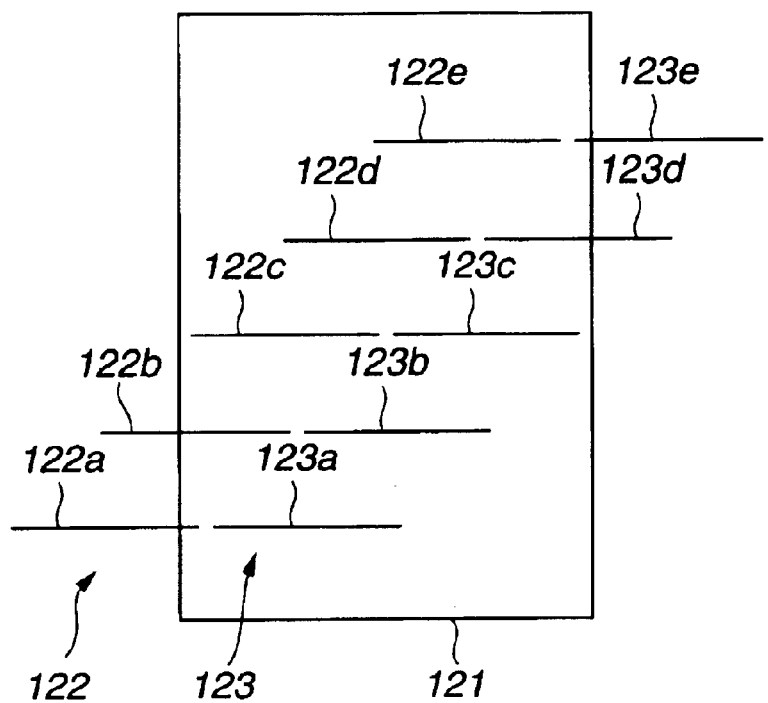
FIG. 8 explains how data is read by a playback head having a width W1 given by an equation (1) when N=2 and which is rotated at a speed double that when the data has been recorded.

More particularly, when the playback head has a head width W1 given by the above equation (1) when N=2 and the speed of the rotating drum 5 for data reading is double that for data writing, first scans 122a to 122e and second scans 123a to 123e include ones by which data recorded in the adjacent patterns are not covered, as shown in FIG. 8 (first scans denoted generally as 122, second scans denoted generally as 123).

That is, as will be shown in FIG. 8, of the pair of scans 122a and 123a, the scan 123a does not cover data in any of the adjacent recording pattern. Of the pair of the scans 122b and 123b, the scan 123b does not cover data in any of the adjacent recording pattern. Of the pair of scans 122c and 123c, both do not cover data in any adjacent recording patterns. Of the pair of scans 122d and 123d, the scan 122d does not cover data in any of the adjacent recording pattern. Of the pair of scans 122e and 123e, the scan 122e does not cover data in any of the adjacent recording patterns.

Figure 9:
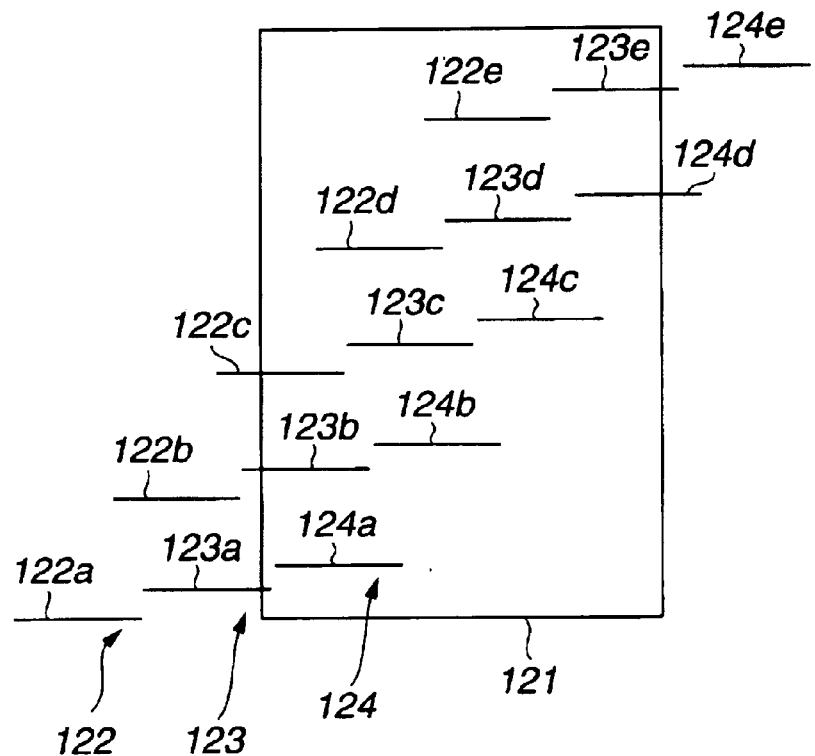
FIG. 9 explains how data is read by a playback head having a width W1 given by an equation (1) when N=3 and which is rotated at a speed three times higher than that when the data has been recorded.

Also, when the playback head has a head width W1 given by the above equation (1) when N=3 and the speed of the rotating drum 5 for data reading is three times of that for data writing, first scans 122a to 122c, second scans 123a to 123e and third scans 124a to 124e include ones which do not cover data recorded in the adjacent patterns, as shown in FIG. 9 (third scans denoted generally as 124).

Namely, using data detected by the scans 124a, 124b and 123c, scans 124c and 122d, or scans 123d and 122e, the recording and/or reproducing apparatus 1 reproduces data from the recording patterns.

The recording and/or reproducing apparatus 1 records and reproduces data based on the assumption that there is no fluctuation such as jitter in recording and reproduction. When data recording and reproduction are done with any fluctuation, then it must be taken in consideration.

In the data recording and/or reproducing apparatus 1, a single playback head is used to read data. To read data having been recorded with the same azimuth for an increased track density, the head width W1 of the playback head is set to $((N-1)/N)*Tp$ when the rotating drum speed is N times higher than that for data writing, and the non-tracking reading is done so that some of a plurality of scans will not cover data in adjacent recording patterns. Thus data can be read with a better S/N ratio with no crosstalk from the adjacent recording patterns. Therefore, the recording and/or reproducing apparatus 1 can read data with good characteristics even when the track pitch is small.

The recording and/or reproducing apparatus 1 can make good digital recording and reproduction with a small track pitch of 3 $\mu$m or less for example, and attain a recording density of 1 Gbits/inch$^2$ or more. Thus, the present invention can be applied to an apparatus which records to a small tape-shaped recording medium a large volume of data such as high definition (HD) image.

Also, with N=3 and the head width W1 of the playback head being set to $\frac{2}{3}$ of the recording width W2 of the recording patterns, for example, to increase the head width W1 of the playback head, the S/N ratio of the read signal and playback characteristics can be improved as compared with those with N=2.

Figure 10:
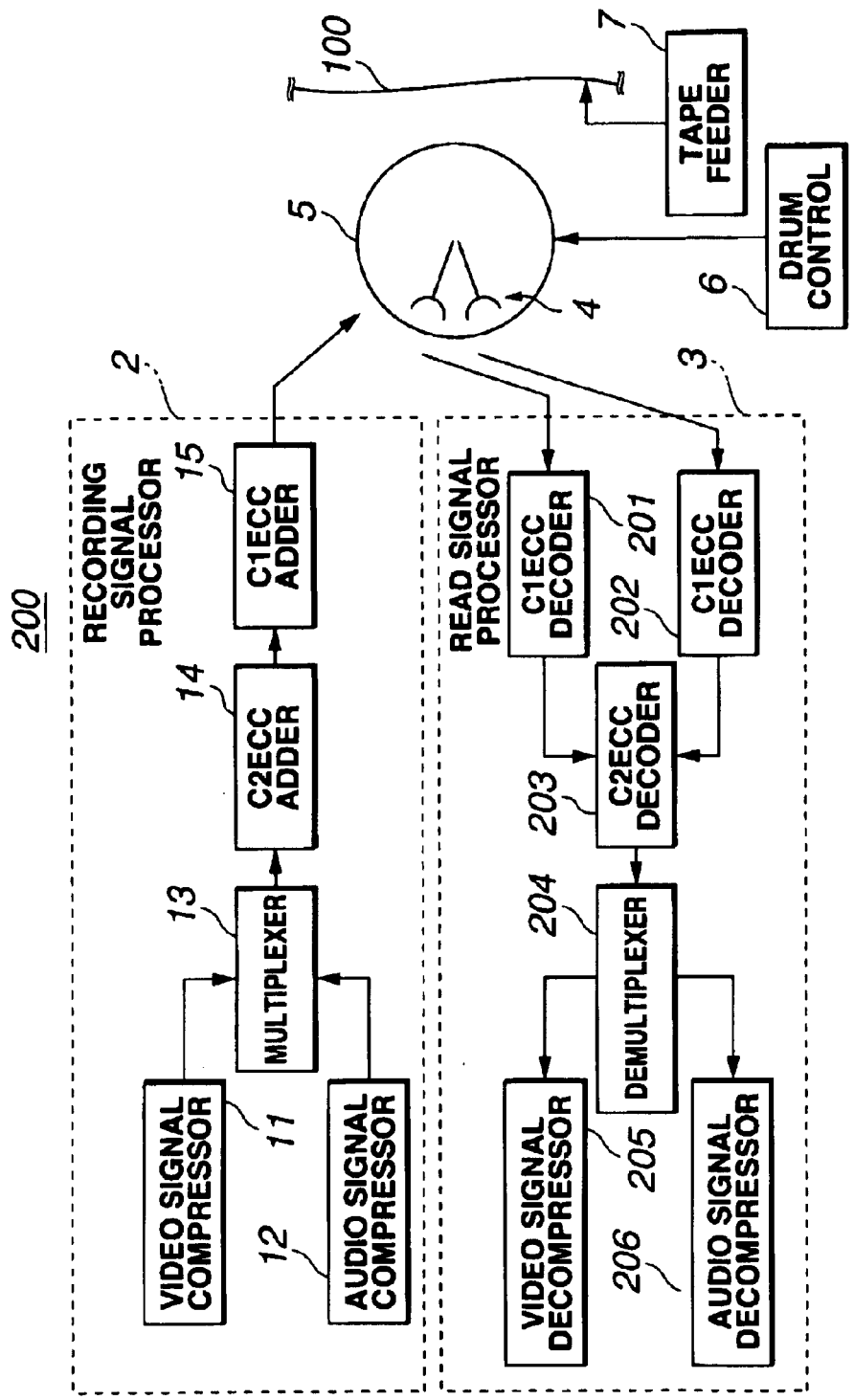
FIG. 10 is a block diagram of a second embodiment of the recording and/or reproducing apparatus according to the present invention.

Referring now to FIG. 10, there is illustrated in the form of a block diagram the second embodiment of the recording and/or reproducing apparatus according to the present invention, which records and/or reproduces data to and/or from a tape-shaped recording medium. Note that of the second recording and/or reproducing apparatus, the same or similar elements as in the recording and/or reproducing apparatus 1 will be indicated with the same or similar references as in FIGS. 5 to 9 and will not be described in further detail.

The recording and/or reproducing apparatus according to the second embodiment of the present invention is generally indicated with a reference 200. The read signal processor 3 used in the recording and/or reproducing apparatus 200 is constructed as shown in FIG. 10 when the magnetic head has first and second playback heads. More particularly, the read signal processor 3 in the recording and/or reproducing apparatus 200 includes C1ECC decoders 201 and 202, C2ECC decoder 203, demultiplexer 204, video signal decompressor 205 and an audio signal decompressor 206.

The C1ECC decoder 201 is supplied with a read signal detected by the first playback head. The read signal is composed of video and audio data, C1ECC and C2ECC. The C1ECC decoder 201 uses the C1ECC to correct an error in the video and audio data in the direction of C1, and provides the read signal corrected in the direction of C1 to the C2ECC decoder 203.

The C1ECC decoder 202 is supplied with a read signal detected by the second reading signal. As in the C1ECC decoder 201, the C1ECC decoder 202 uses the C1ECC to correct the video and audio data in the direction of C1, and provides the corrected read signal to the C2ECC decoder 203.

The C2ECC decoder 203 uses the C2ECC contained in the read signals supplied from the C1ECC decoders 201 and 202 to correct an error in the video and audio signal in the direction of C2, and provides the read signal corrected in the direction of C2 to the demultiplexer 204.

The demultiplexer 204 divides the read signal from the C2ECC decoder 203 into video and audio signals, and provides the video signal to the video signal decompressor 205 while providing the audio signal to the audio signal decompressor 206.

The video signal decompressor 205 decompresses the video signal supplied from the demultiplexer 204 in a predetermined format, and provides it as a read signal to outside.

The audio signal decompressor 206 decompresses the audio signal supplied from the demultiplexer 204 in a predetermined format, and provides it as a read signal to outside.

As shown in FIG. 10, the recording and/or reproducing apparatus 200 is different from the first embodiment (recording and/or reproducing apparatus 1) in that it includes the magnetic head 4 with the first and second playback heads, and the read signal processor 3 to reproduce signals detected by the first and second playback heads.

That is, in the recording and/or reproducing apparatus 1 in which the rotating speed of the rotating drum 5 for data reading is set to be N times higher than that for data writing to make, for data reading, a number of scans N times larger than that for data writing, the vibration or the like may possibly be caused by the power and rotation because of the increased rotating speed of the rotating drum 5. On the contrary, the number of scans is increased by increasing tie number of playback heads in the recording and/or reproducing apparatus 200.

For use in the recording and/or reproducing apparatus 200, the magnetic head 4 is formed using the thin film forming process by which a magnetic resistance effect (MR) head or thin film head for example are formed. The second and subsequent playback heads are formed at intervals as given as follows:

$$(K_1+(1/M))Tp, (K_2+(2/M))Tp, \ldots, (K_{M-1}+((M-1)/M))Tp \quad (2)$$

where M is the number of playback heads provided in the magnetic head 4, $K_1, K_2, \ldots, K_{M-1}$ are integers. Also in the magnetic head 4, the head width W1 is $((M-1)/M)*Tp$ or less.

Figure 11:
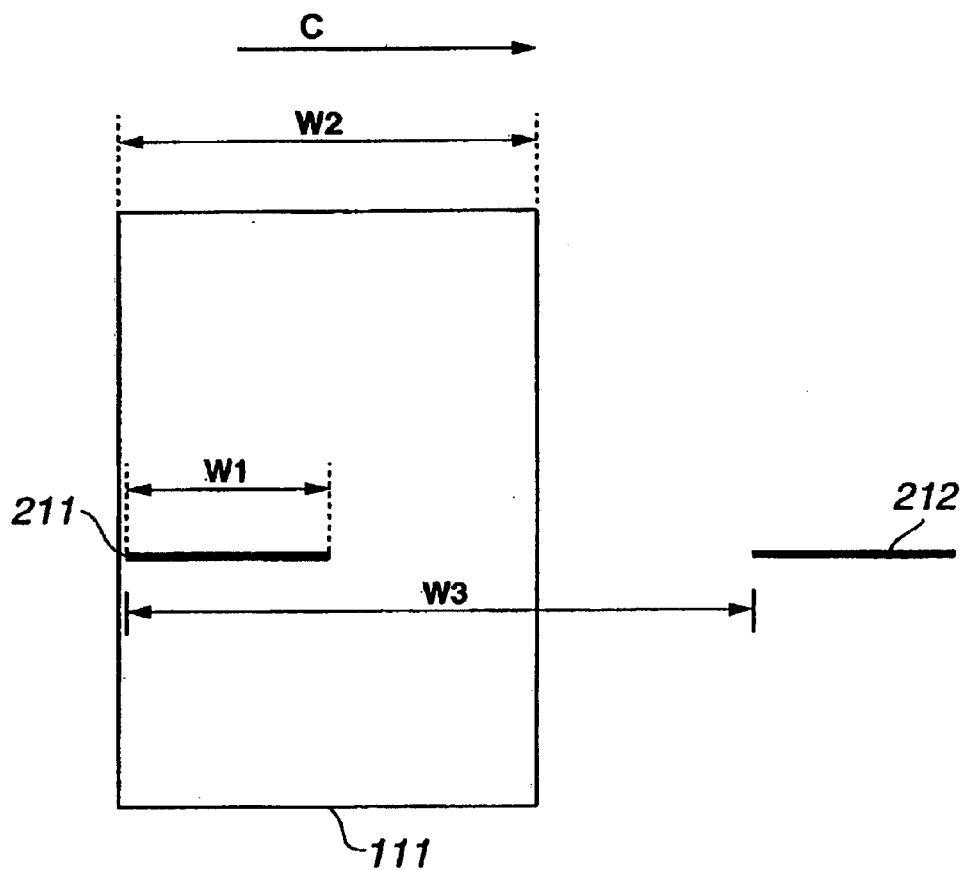
FIG. 11 explains the physical relation between first and second playback heads.

When the magnetic head 4 is to have the record head, first and second playback heads for example, the first and second playback heads are formed in positions satisfying the expression (2) in the one-dimensional direction C as shown in FIG. 11. In this embodiment, since the magnetic head 4 has two playback heads (M=2), first and second playback heads 211 and 212 are formed with an interval W3 which is about 1.5 times larger than the track pitch Tp of recording patterns 111 formed on a tape-shaped recording medium (will be referred to as "magnetic tape" hereinafter) 100. Also in this case, the head width W1 of the playback heads is set to a half or less of the recording width W2 of the recording patterns 111.

Figure 12:
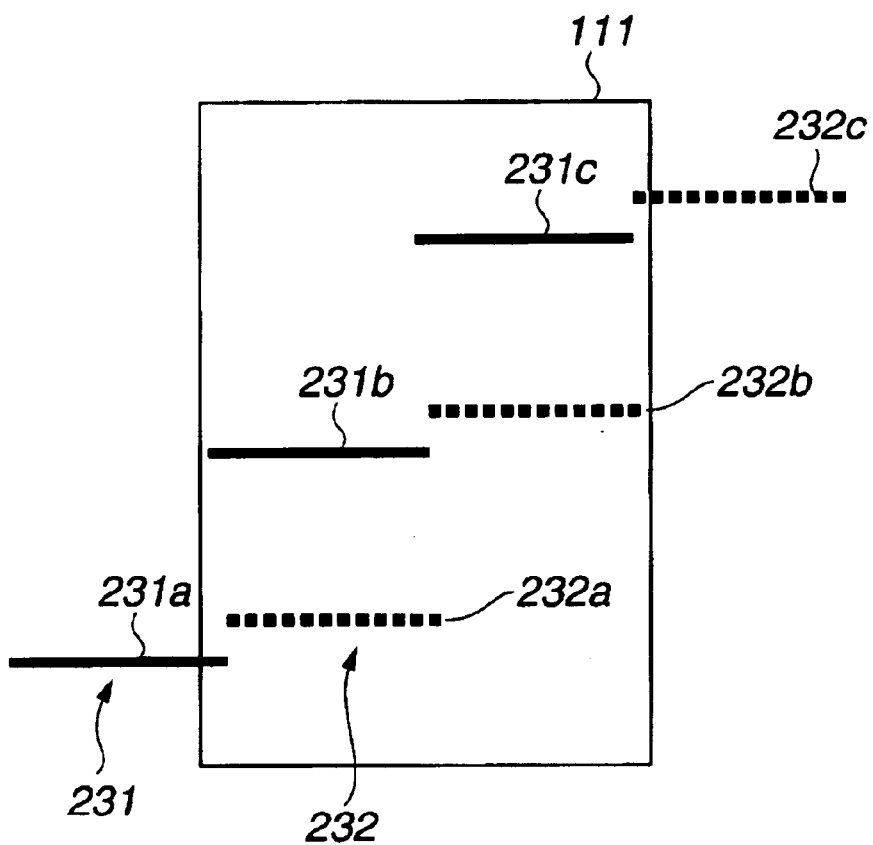
FIG. 12 how data is read by the use of a magnetic head having a width W3 given by an expression (2) when M=2 and in which first and second playback heads are formed.

More particularly, when M=2, the magnetic head 4 has the first and second playback heads with a head with W3 given by the expression (2), and scans 231a to 231c by the first playback head and scans 232a to 232c by the second playback head include some which do not cover data recorded in the patterns adjacent to the recording pattern 111, as shown in FIG. 12 (first scans denoted generally as 231, second scans denoted generally as 232).

Namely, of the scans 231a and 232a, the scan 232a will not cover the data recorded in the patterns adjacent to the recording pattern 111, of the scans 231b and 232b, both will not cover the data recorded in the patterns adjacent to the recording pattern 111, and of the scans 231c and 232c, the scan 231c will not cover the data recorded in the patterns adjacent to the recording pattern 111.

Figure 13:
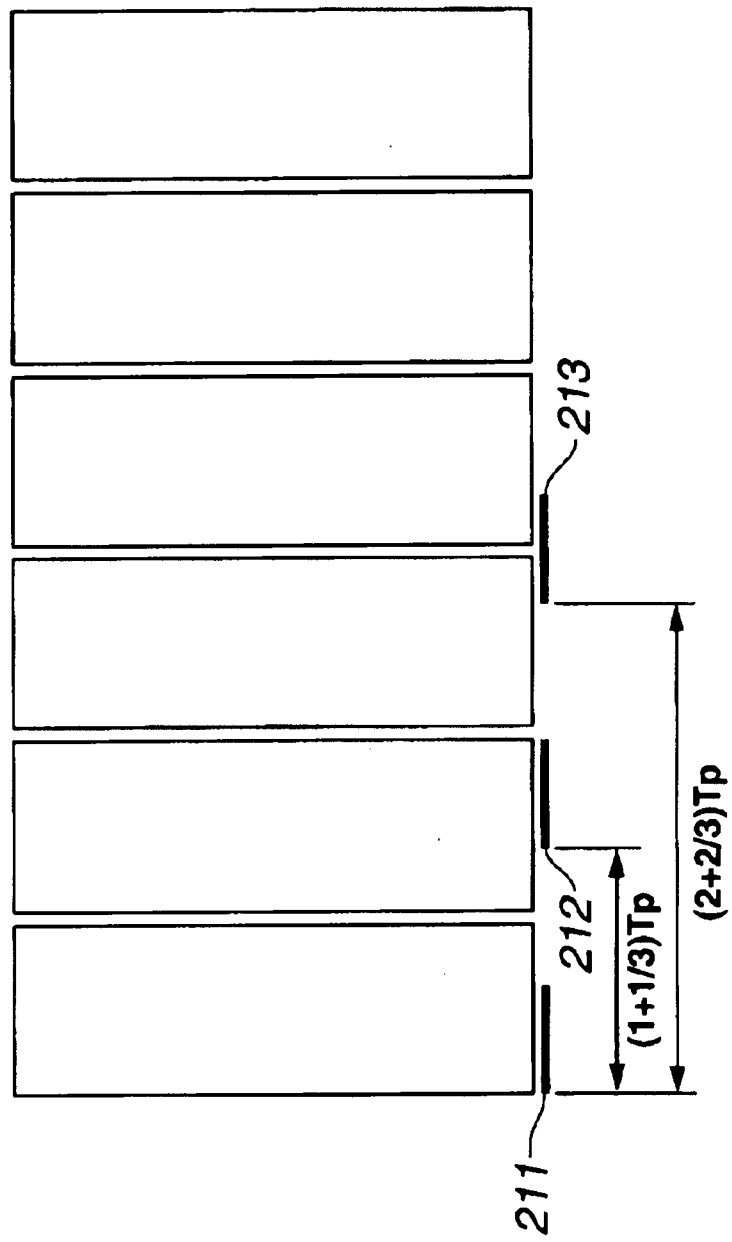
FIG. 13 explains the physical relation between the first and second playback heads and that between the first and third playback heads.

When M=3, the head interval W3 between the first and second playback heads 21 1and 212 is $(1+\frac{1}{3})Tp$ while the head interval between the first playback head 211 and a third playback head 213 is $(2+\frac{2}{3})Tp$, by applying the above expression (2), as shown in FIG. 13.

Figure 14:
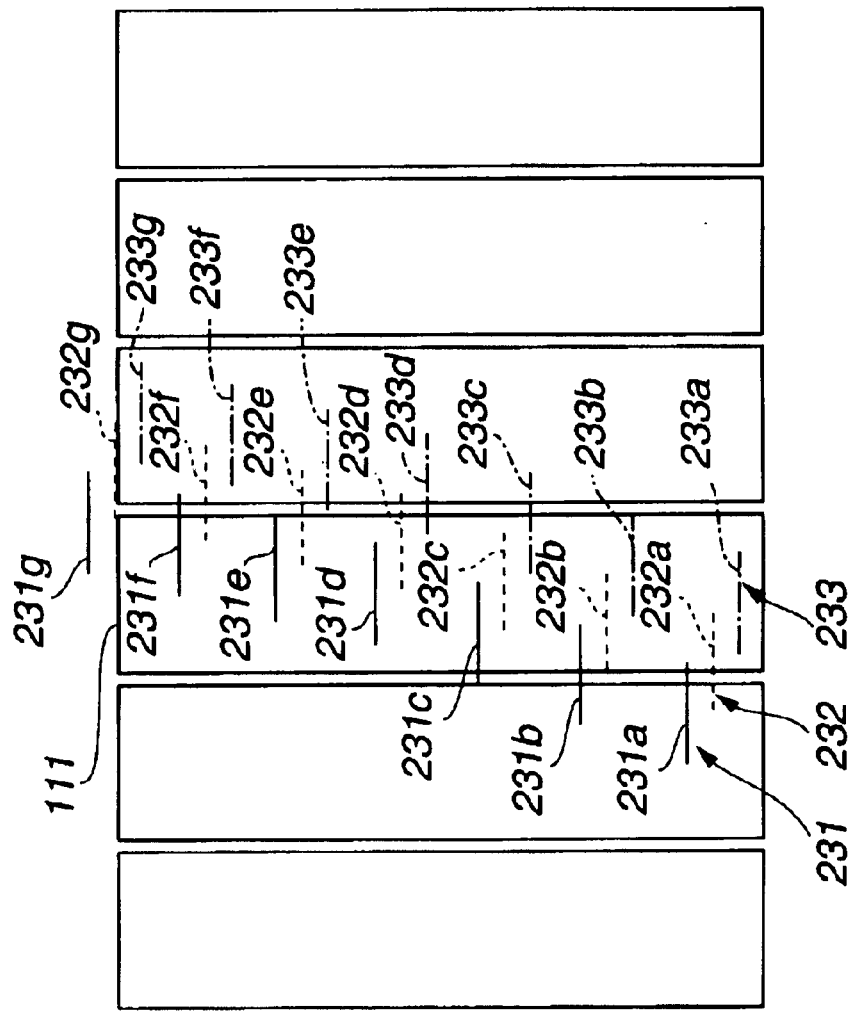
FIG. 14 how data is read by the use of a magnetic head having a width W3 given by an expression (2) when M=3 and in which first, second and third playback heads are formed.

By reading data by the recording and/or reproducing apparatus 200 having the magnetic head 4, scans 231a to 231g by the first playback head, scans 232a to 232g having been done by the second playback head before the scans by the first playback head, and scans 233a to 233g having been done by the third playback head before the scans by the second playback head include some which will not cover the data recording in the adjacent recording tracks, as shown in FIG. 14 (third scans denoted generally as 233).

In the recording and/or reproducing apparatus 200, data detected by the scan 233a, 232b or 233b, 232c, 231d and 231e which would be done by scanning only a target recording track 111 is used to reproduce data from the recording tracks.

Note that the recording and/or reproducing apparatus 200 records and reproduces data based on the assumption that there is no fluctuation such as jitter in recording and reproduction. When data recording and reproduction are done with any fluctuation, then it must be taken in consideration.

In the recording and/or reproducing apparatus 200, data is read from the magnetic tape by the magnetic head 4 with the playback heads having the head width W1 being $((M-1)/M)*Tp$ and spaced with the head interval W3 given by the expression (2). Therefore, by using a read signal from the playback head only when scanning the target recording pattern 111, data recorded with no azimuth in the magnetic tape 100 can be read by adopting the non-tracking method.

Therefore, different from the recording and/or reproducing apparatus 1, the recording and/or reproducing apparatus 200 can read data azimuth-less recorded in the magnetic tape 100 by the non-tracking method without increasing the rotating speed of the rotating drum 5. Thus, the vibration and noise which will be caused by a high speed of the rotating drum 5 can be suppressed more in the recording and/or reproducing apparatus 200 than in the recording and/or reproducing apparatus 1. Also, the recording and/or reproducing apparatus 200 can read data at the same rate as the recording and/or reproducing apparatus 1, and so it can be used in combination with the recording and/or reproducing apparatus 1. In this case, the power is consumed less than in the recording and/or reproducing apparatus 1.

Also, with M=3 and the head with W1 of the playback heads being $\frac{2}{3}$ of the track width W2 of the recording tracks, the head width W1 of the playback heads can be larger than when M=2. Thus, data can be read with a better S/N ratio of the read signal and at an improved error rate.

Figure 15:
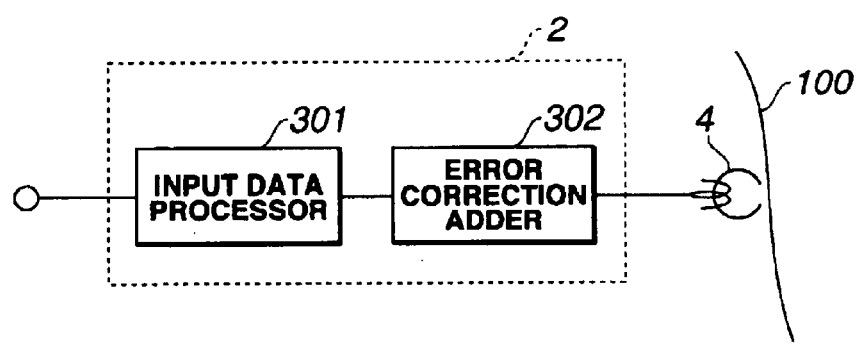
FIG. 15 is a block diagram of another recording signal processor included in the recording and/or reproducing apparatus according to the present invention.

Referring now to FIG. 15, there is shown a block diagram of another recording signal processor included in the recording and/or reproducing apparatuses 1 and 200 according to the present invention. The recording signal processor is not limited to the aforementioned one but may be a one shown in FIG. 15. The recording signal processor 2 includes an input data processor 301 and error correction code adder 302. The recording signal processor 2 is supplied with a data stream for example, and converts it to data in units of sync signal by adding a sync No. to the data in the input data processor 301. The error correction code adder 302 adds an error correction code to the data in units of sync signal from the input data processor 301, and provides it to the magnetic head 4.

In the foregoing, it has been described that the recording and/or reproducing apparatus 1 reads azimuth-less recorded data from the magnetic tape 100 by the non-tracking method at a high speed of the rotating drum 5 and that the recording and/or reproducing apparatus 200 reads azimuth-less recorded data from the magnetic tape 100 by the non-tracking method with a larger number of playback heads. However, data may be read with the larger number of playback heads and a higher speed of the rotating drum 5. That is to say, a combination of the recording and/or reproducing apparatuses 1 and 200 may be used to read azimuth-less recorded data from the magnetic tape 100 by the non-tracking method.

What is claimed is:

1. A data recording and/or reproducing apparatus comprising:

means for feeding a tape-shaped recording medium in which data is recorded along recording tracks tilted in relation to the moving direction of the recording medium;

a writing/playback head having a playback head having a width smaller than the recording width of the recording tracks and which reads data from the tape-shaped recording medium, and a record head to write data along the recording tracks;

a rotating drum having the writing/playback head mounted thereon and on which the tape-shaped recording medium is scanned by the writing/playback head;

a reading controlling means for providing such a control that data recorded in each track on the tape-shaped recording medium is detected in its entirety with at least two scans of the recording medium by the playback head; and means for generating data recorded on the tape-shaped recording medium from the data detected by the playback head having been controlled by the reading controlling means to make the plurality of scans of the recording tracks.

2. The apparatus as set forth in claim 1, wherein the reading controlling means controls the rotating speed of the rotating drum for data reading to N times of that of the rotating drum for data writing, N being a positive integer, and wherein data is read by the playback head having a width equal to or less than (N−1)/N of the recording track width.

3. The apparatus as set forth in claim 2, wherein the recording controlling means controls the rotating speed of the rotating drum for data reading to two times of that of the rotating drum for data writing and data is read by the playback head having a width equal to or less than a half of the recording track width.

4. The apparatus as set forth in claim 1, wherein the writing/playback head has M playback heads disposed in a line, M being a positive integer, and wherein the width of each playback head is (M−1)/M or less of the recording width, the M playback heads being spaced from each other with a distance which is (K+0.5) (K is a positive integer including zero) times of the recording pitch of the recording tracks.

5. The apparatus as set forth in claim 4, wherein the writing/playback head has two playback heads disposed in a line and the width of each playback head is a half of the recording width, the two playback heads being spaced from each other with a distance which is 1.5 times of the recording pitch of the recording tracks.

6. A data recording and/or reproducing method to be adopted in a data recording and/or reproducing apparatus comprising:

means for feeding a tape-shaped recording medium;

a writing/playback head having a playback head having a width smaller than the recording width of the recording tracks and which data from the tape-shaped recording medium, and a record head to write data along the recording tracks; and a rotating drum having the writing/playback head mounted thereon to move the writing/playback head on the tape-shaped recording medium, the method comprising steps of:

controlling the playback head to scan each recording tracks at least two times;

detecting data of the entirety of said track by the playback head having scanned the recording tracks the plurality of times; and generating, from the detected data, data recorded in the tape-shaped recording medium.

7. The method as set forth in claim 6, wherein the reading controlling means controls the rotating speed of the rotating drum for data reading to N times of that of the rotating drum for data writing, N being a positive integer, and wherein data is read by the playback head having a width equal to or less than (N−1)/N of the recording track width.

8. The method as set forth in claim 7, wherein the reading controlling means controls the rotating speed of the rotating drum for data reading to two times of that of the rotating drum for data writing and data is read by the playback head having a width equal to or less than a half of the recording track width.

9. The method as set forth in claim 6, wherein the writing/playback head has M playback heads disposed in a line, M being a positive integer, and wherein the width of each playback head is (M−1)/M or less of the recording width, the M playback heads being spaced from each other with a distance which is (K+0.5) (K is a positive integer including zero) times of the recording pitch of the recording tracks.

10. The method as set forth in claim 9, wherein the writing/playback head has two playback heads disposed in a line and the width of each playback head is a half of the recording width, the two playback heads being spaced form each other with a distance which is 1.5 times of the recording pitch of the recording tracks.

\* \* \* \* \*